United States Patent Office 3,310,231
Patented Mar. 21, 1967

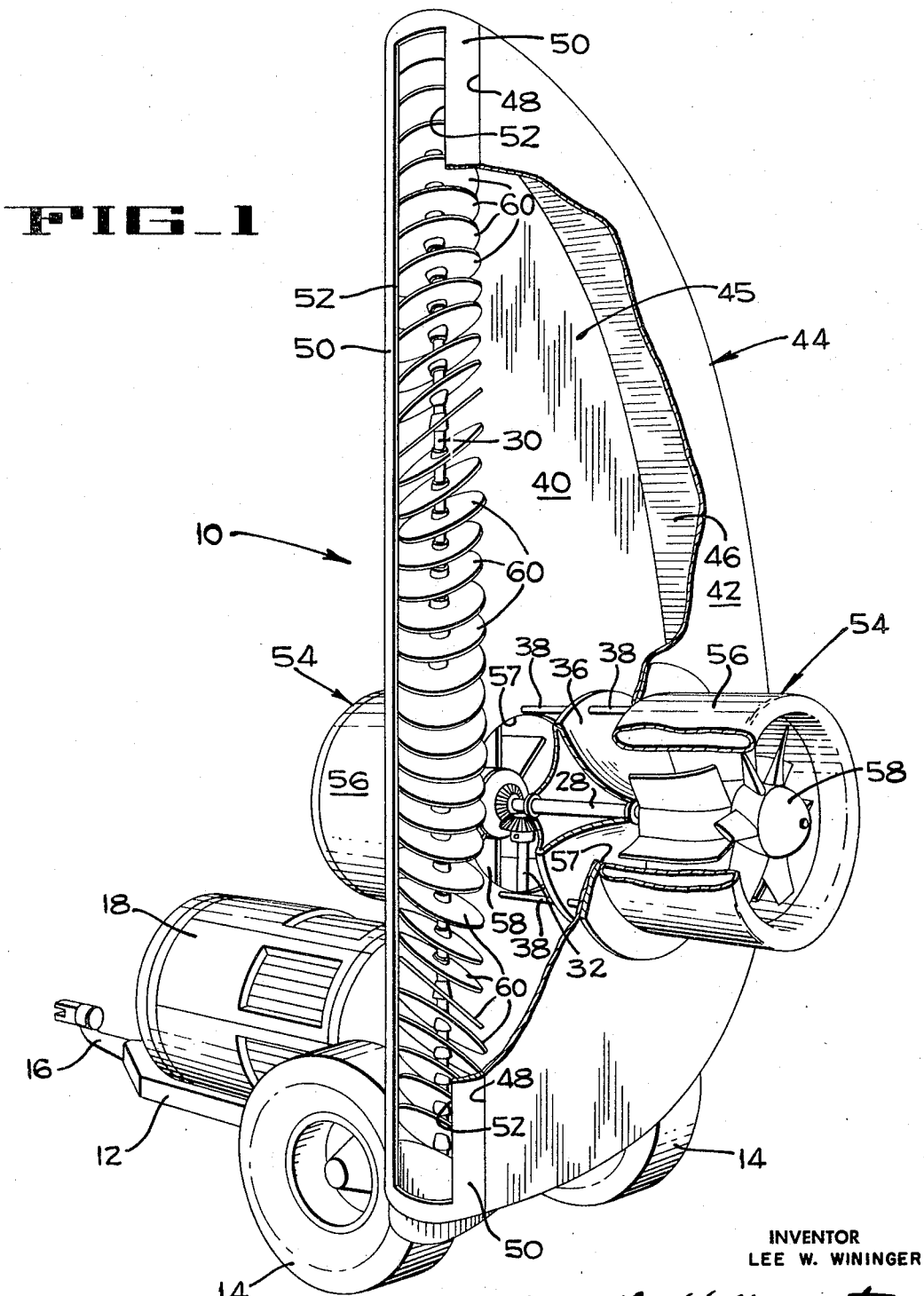

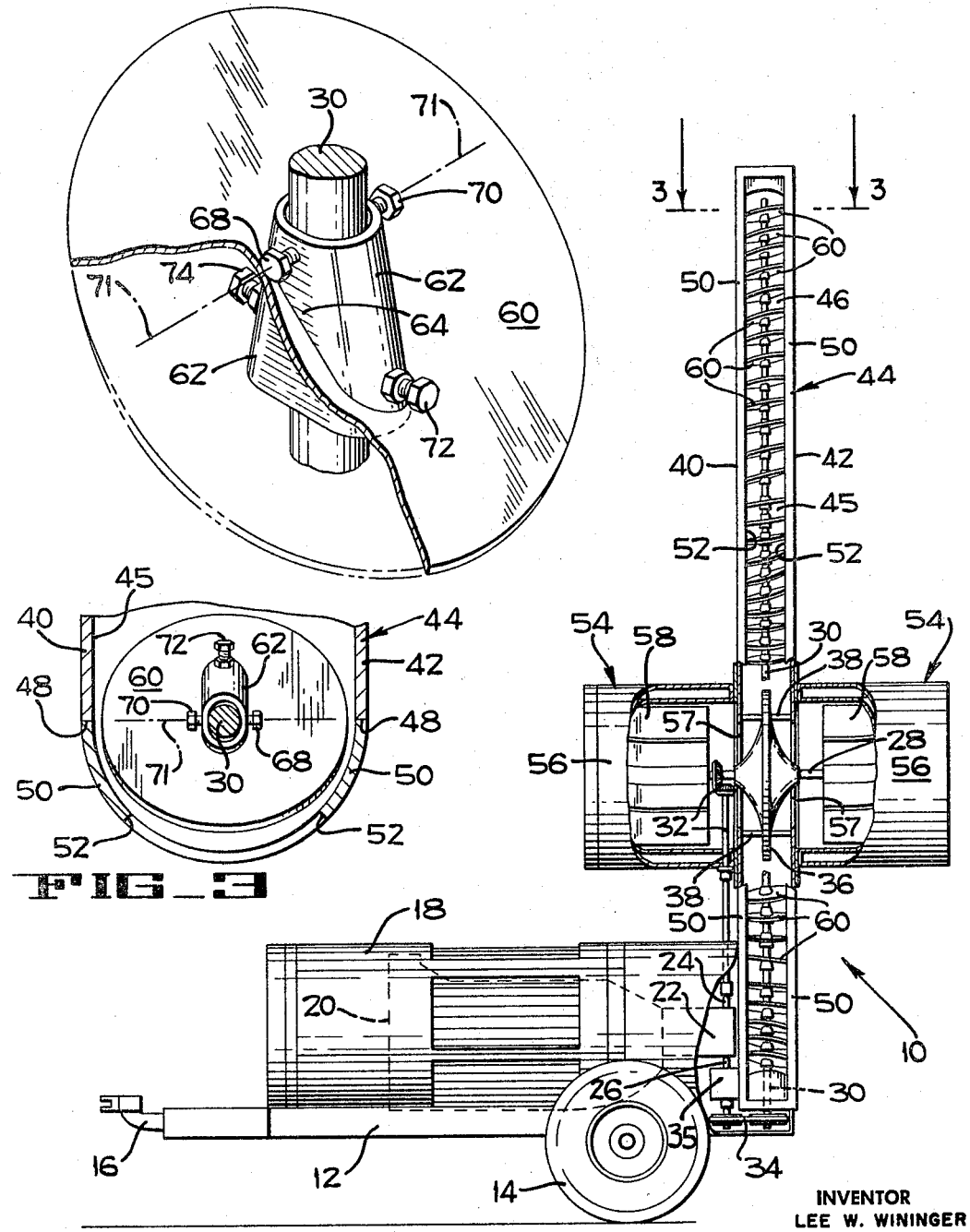

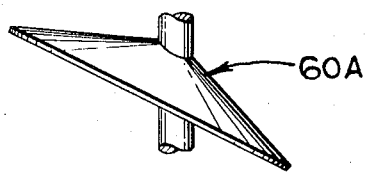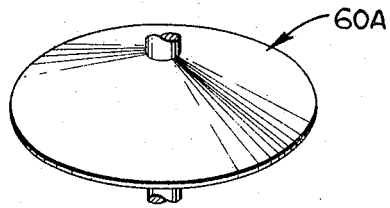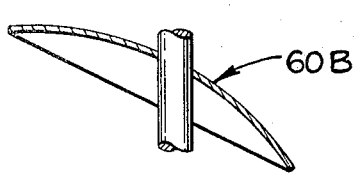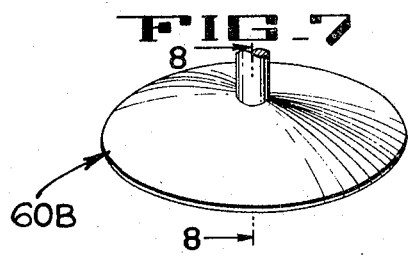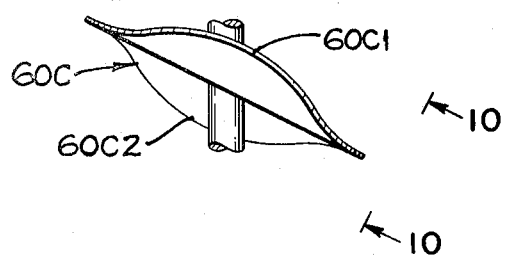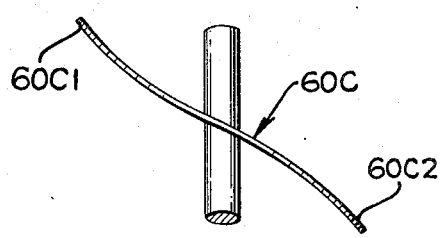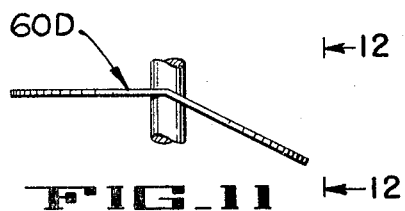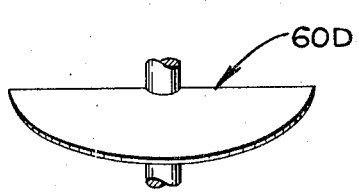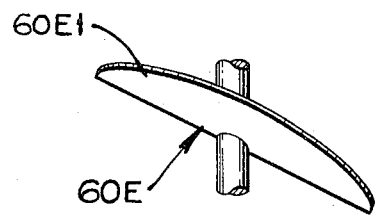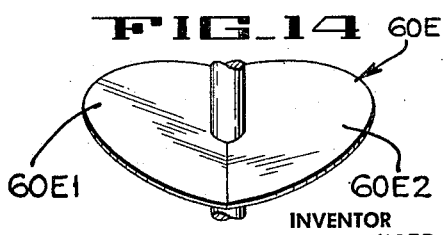

3,310,231
FRUIT HARVESTING MACHINE
Lee W. Wininger, Carmel, Calif., assignor to FMC Corporation, San Jose, Calif., a corporation of Delaware
Filed Apr. 8, 1964, Ser. No. 358,319
11 Claims. (Cl. 230—274)

The present invention pertains to the mechanical harvesting of fruit from orchard trees, and more particularly concerns a machine for harvesting fruit by means of a high velocity air blast.

In a relatively recent development the rows of trees in citrus orchards and the trees in each row are planted close together in order to conserve space. The sides of the trees in the rows are trimmed hedge-style to admit the maximum amount of sunlight and for access to the trees in the row by cultivators, sprayers and other agricultural vehicles. The trimming and the close interspacing of the trees causes their foliage to be very dense and the limbs shorter than usual. As a result, the trees are more difficult to harvest, either manually or by the usual mechanical shaker mechanisms, because it is difficult to locate and gain access to the limbs or the fruit, and the short limbs are difficult to shake. Also mechanical shakers which grip and oscillate the tree limbs are relatively ineffective when portions of the limbs correspond to fixed nodes of the waves induced in other parts of the limb. Consequently, the fruit near or at the node points might not be detached, even though the adjacent limb portions are violently oscillated.

The harvesting machine of the present invention dislodges the fruit by means of a continuously swerving air blast which effectively penetrates the densest foliage and causes a progressively increasing wafting of the limbs and the fruit until the fruit falls free. Further, the harvesting machine is effective to dislodge the fruit while the machine travels past the trees thus eliminating the need for stopping at each tree.

An object of the present invention is to provide an improved fruit harvesting machine.

Another object of the present invention is to provide a fruit harvesting machine which requires no attachment to the trees, and which can harvest the fruit while in continuous motion past the trees.

Another object of this invention is to provide an efficient fruit harvesting machine which will not damage the limbs or foliage of the trees and will not compact the earth adjacent the trunks of the trees.

A further object is to provide means for generating a swerving air blast, which air blast is characterized by smooth transition flow in its various changes of direction.

An object is to provide a fruit harvesting machine which requires access to only the sides of the tree rows, in contrast to ordinary harvesting machines which may be positioned at the side of the row, but require some access between the trees in the row in order to manipulate a shaker boom or the like.

An object is to provide, in a fruit harvesting machine, means for producing multi-directional movements to the fruit and limbs without physical contact therewith.

Other objects and advantages of the present invention will become evident from the following description and from the accompanying drawings, wherein:

FIGURE 1 is a schematic perspective, partly broken away to show inner structure otherwise concealed, of the fruit harvesting machine of this invention.

FIGURE 2 is a reduced schematic side elevation of the machine shown in FIGURE 1, partly broken away to disclose the drive train.

FIGURE 3 is an enlarged horizontal fragmentary section taken along lines 3—3 on FIGURE 2, and particularly illustrates the air blast throat and means for causing the air blast to swerve.

FIGURE 4 is an enlarged perspective of a portion of the air deflecting vane unit, particularly showing the mounting of an individual vane on the shaft of the unit.

FIGURE 5 is a fragmentary side elevation of a second embodiment of the air-deflecting vane used in the machine of FIGURE 1.

FIGURE 6 is a front elevation taken looking in the direction of lines 6—6 of FIGURE 5.

FIGURE 7 is a side elevation of a third embodiment of the deflection vane.

FIGURE 8 is a section taken on line 8—8 of FIGURE 7.

FIGURE 9 is a side elevation of a fourth embodiment of the deflecting vane.

FIGURE 10 is a front elevation of the vane of FIGURE 9, looking in the direction indicated by line 10—10 of FIGURE 9.

FIGURES 11 and 12 are side and front elevations respectively of a fifth embodiment of the deflecting vane.

FIGURES 13 and 14 are side and front elevations of a sixth embodiment of the deflecting vane.

The harvesting machine 10 (FIG. 1) includes a frame 12 which is supported by wheels 14 and has a forwardly projecting draft arm 16 that can be coupled to an orchard truck or tractor.

Mounted on the frame 12 (FIG. 2) is a conventional sheet metal housing 18 which encloses a gasoline engine power unit generally indicated by the dotted outline 20. The power unit 20 includes a transmission 22 which has two separate vertical output shafts, an upper shaft 24 and a lower shaft 26. Shafts 24 and 26, respectively, drive a horizontally positioned blower driveshaft 28 and a vertically disposed air deflector driveshaft 30. The driveshaft 28 is coupled to the transmission shaft 24 by a bevel gear and shaft drive train 32, and the driveshaft 30 is coupled to the transmission shaft 26 by a belt and pulley drive train 34 and an intermediate transmission 35. The transmission 35 permits operation of the driveshaft 30 at various speeds independent of the speed of the driveshaft 28.

It is preferable that the transmission 35 be of a type which can have its drive ratio varied while transmitting power. For this purpose, one of the well known variable speed belt transmissions can be used, or the shaft 30 can be coupled to a hydraulic motor, driven by fluid under pressure from a suitable pump coupled to the power unit 20 and controlled in the usual manner by a hydraulic valve which regulates the flow of fluid through the motor.

The blower shaft 28 extends through a combination supporting hub and air deflector head 36 which is in the form of two substantially bell-shaped members integrally formed or secured base-to-base. The deflector head 36 is rigidly mounted upon support shafts 38 that interconnect two spaced vertical walls 40 and 42 which define the front and rear walls of an air guide housing 44 that encloses an air pressure and distribution chamber 45. A side wall 46 interconnects correspondingly curved edges of the walls 40 and 42, and terminates at its upper and lower ends along a vertical linear edge 48 of each wall 40 and 42. The edges 48 (FIG. 3) are secured to the adjacent end portions of a vertically elongate semi-cylindrical shroud 50 which has closed upper and lower ends, not shown, and which is provided with an elongate narrow aperture 52 that delineates an air discharge throat communicating with the pressure chamber 45. The vertical extent of the throat 52 is approximately the same as the distance between the lowermost and uppermost foliage of the tallest of the trees to be harvested.

Means for generating a continuous high velocity airstream and for transmitting the airstream into the chamber 45 are provided in the form of two blowers 54 (FIGS. 1 and 2). Each blower is provided with a cylindrical shroud 56 that is secured to the adjacent wall 40 and 42 in alignment with a wall aperture 57, and with an axial flow impeller unit 58 that is mounted on the driveshaft 28. Conventional air inlet screens, not shown, may be mounted on the open outer ends of the shrouds 56 to prevent the entry of debris into the impeller housing.

The particular shape of the air distribution chamber 45 is not critical, the general requirement being that the upper portion of the air discharge throat will receive some substantial portion of the total volume of air projected toward the throat 52. It should be noted that the chamber 45 does not require the particular dual blower arrangement illustrated since a continuous high volume, high pressure air blast can be delivered to the discharge throat 52 by various well known air generating and air directing means including centrifugal blowers and directional walls to apportion the air and obtain air balance within the chamber.

A plurality of air deflecting vanes 60 (FIGS. 1 and 2) are adjustably secured to the air deflector driveshaft 30 for rotation therewith. Each vane 60 is of circular form and is mounted in oblique relation to the driveshaft 30; the interspacing of the vanes is substantially the same. However, the interspacings of the deflecting vanes, their phase relation to each other, and their angular relation to the driveshaft may be varied. Accordingly, the deflecting vanes 60 can be preset to intercept, and regulate to different extents, various portions of the air blast directed toward the throat 52.

It should be particularly noted that both the upper and lower surfaces of the air deflecting vanes 60 are presented to the air blast as they are revolved with the driveshaft 30. Therefore, the transition of the airflow, when it ceases to be deflected by one vane surface and impinges the other surface of the same vane, is very smooth because the vane area confronting the airflow during such transition continuously changes. This construction and arrangement of the air deflecting vanes 60, it is to be noted and emphasized, differs from prior art oscillating vane devices for controlling an air blast in that the rotating vanes 60 have a wobbling motion instead of the conventional oscillating motion. Accordingly, each air deflecting vane 60 not only causes the air blast to oscillate in one direction, but causes the blast to also be simultaneously deflected in another direction at varying angles as the vane rotates away from its edgewise position relative to the air blast source. The net result of the actions of the vanes 60 is thus to produce a swerving air blast having upward, sideward and forward directional movements, all of which are characterized by smooth airflow transition from one direction to the other.

In order to minimize interaction of the air currents between the vanes 60, each vane is only slightly out of phase with the adjacent vanes. Each vane mounting arrangement, however, permits all of the vanes to be in phase if so desired. The mounting means for each vane 60 (FIG. 4) includes a hub 62 which may be formed by flattening two opposite sides of a hollow conical member; one flattened side of the hub 62 is shown at 64. The narrow inside dimension of the hub 62 is such that the hub slidably engages the driveshaft 30 along the flattened areas.

Lock bolts 68 and 70 which lie on a common axis 71 are threaded through apertures in the upper portion of the flattened sides of the hub 62 and engage the driveshaft 30 so that the hub is axially fixed on the driveshaft but can be adjustably swung about the axis 71 when the bolts 68 and 70 are backed-off. The hub 62 extends through the vane 60 and is welded thereto, the preferred arrangement being such that the general plane of the vane 60 is non-perpendicular to the longitudinal axis of the hub 62 so that the vane is partially tilted even though the hub might be symmetrically disposed upon the driveshaft 30. When the vane 60 is moved to its desired tilted position by swinging it and the hub about the axis of the lock bolts 68 and 70, lock bolts 72 and 74, which extend through the hub at right angles to the bolts 68 and 70, are run in until they abut the driveshaft, and are secured in place by associated lock nuts.

When the fruit harvester 10 is placed in operation, it is pulled into an orchard behind a draft vehicle. The harvester and vehicle are aligned with the lane between two adjacent tree rows and, after the catch frames are placed under the trees to collect the harvested fruit, the engine unit 20 is started. The throttle control, not shown, which may be operable at the harvester 10 or at the draft vehicle, is then set to the required operating speed. The blowers 54 thus force air through the chamber 45 and past the rotating air deflecting vanes 60 in the air discharge throat 52. The inwardly curved walls of the discharge shroud 50 (FIG. 3) direct the air blast inwardly from opposite sides, and this action of the walls combined with the action of the vanes 60 causes the issuing air blast to continuously swerve in various directions. The harvester 10 is then pulled slowly along the edge of the left-hand tree row with the discharge throat 52 close to the trees. The transmission 35 can be preset for a desired speed of the air deflecting vane driveshaft 30, or can be manipulated while the harvester is operating to obtain the most efficient rotational speed for the air deflecting vanes 60.

As the swerving air blast initially impinges the leaves of the tree, the fruit, leaves, and small branches begin to waft back and forth. This action continues, and the amplitude of movement of the fruit is quickly attained such that the stems of the fruit are severed and the fruit falls onto the catch frame beneath the tree. This fruit severing action is thus accomplished without contacting the tree with any mechanism, whereas the jaws used with the shaker booms of other harvesting machines cause abrading of the limbs and damage to adjacent limbs when the boom is placed in position; tree damage of this type cannot occur with the harvesting machine 10. It is thus important that the fruit is directly oscillated by the air blast, whereas mechanical tree shakers indirectly oscillate the fruit. As a result, the harvesting machine of the present invention dislodges the fruit without violent flailing of the limbs, a feature which assures that the more delicate limbs and branches will not be broken. It is also important to recognize that the air deflecting vanes 60 have utility in connection with orchard sprayers wherein a liquid spray is entrained in an air blast and the air blast must be oscillated in various directions so as to penetrate the foliage. Further, attention is called to the fact that the air deflecting vanes need not be positively driven because they efficiently auto-rotate in the air blast if some of the vanes are out of phase. It is thus contemplated that orchard sprayers of the type mentioned above can advantageously use auto-rotating air deflecting vanes. Obviously, a sprayer using the air deflecting vanes 60 must employ a blower having an air blast that is not powerful enough to detach the fruit.

To clarify and emphasize the novel features of this invention: the air deflector vanes 60 produce a series of uninterrupted and overlapping patterns of air flow each of which continuously moves along diverging conical path. This results in combined stresses on the fruit stems which more effectively severs the stems than the forces produced by the usual harvesting machine, which forces are primarily in only one plane. Further, the air flow pattern provides many approach angles to the fruit, thereby providing efficient results even though some fruit and limbs may not be responsive or accessible to the aerodynamic forces in one or more given planes.

In FIGS. 5 and 6 a conical air-deflecting vane 60A is shown, and in FIGS. 7 and 8 a dome-shaped vane 60B is illustrated. The vane 60C of FIGS. 9 and 10 is generally circular in plan but has one edge portion 60C1 bent upwardly and the diametrically-opposite edge portion to C2 bent downwardly. The vane 60D of FIGS. 11 and 12 is formed from a circular plate that is bent along a diameter to provide two semi-circular deflector portions that are disposed at an obtuse angle relative to each other. In FIGS. 13 and 14 the vane 60E is formed from a circular plate that is bent along a diameter to provide upwardly inclined deflector portions 60E1 and 60E2.

Since each of the vanes of FIGS. 5–14 is welded to a central shaft which rotates during operation of the machine, and since it is intended that a plurality of such vanes will be disposed on each shaft and each shaft will be mounted in the machine in exactly the same manner as shaft 30 of FIG. 1, it will be apparent that by choosing an appropriate one of said vanes, a desired, advantageous, spiralling, swerving movement of air into the trees can be obtained.

Since all of the vanes are secured to their mounting shaft at an angle to the axis of rotation of the shaft, they move with a typical wobble-plate action and, accordingly, their movement will be referred to in the following claims as a wobble-plate movement.

While several embodiments of the present invention have been shown and described it will be understood that the fruit harvester 10 is capable of modification and variation without departing from the principles of the invention and that the scope of the invention should be limited only by the scope and proper interpretation of the claims appended hereto.

I claim:

1. In an agricultural machine, means for generating and discharging an air blast, a freely rotatable shaft disposed in said air blast, means for continuously driving said rotatable shaft, and a plurality of spaced air deflector vanes secured to said shaft in oblique relation therewith and in dissimilar phase relation to one another, wherein said air blast is continuously swerved upon discharge by said air deflector vanes rotatable with said freely rotatable shaft.

2. In an agricultural machine, means for generating an air blast, means defining a discharge throat for confining the discharged air blast, a rotatable shaft disposed in said throat, variable speed drive means for rotating said shaft at a selected speed, and a substantially planar air deflector vane secured to said shaft in oblique relation thereto for swerving the air blast impinging said deflector vane.

3. A fruit harvesting machine, comprising a blower for generating a high velocity air blast, an air guide housing for channeling the air blast from the blower to the discharge end of the housing, a freely rotatable shaft mounted across the discharge end of said housing, means for continuously driving said rotatable shaft, and at least two air deflectors mounted on said shaft in oblique relation thereto and in different phase relation to each other, wherein said air blast is continuously swerved by said air deflectors at the discharge end of the housing during rotation of said deflectors.

4. A fruit harvesting machine comprising a blower for generating an air blast, a housing for channeling the air blast from the blower toward a tree to be harvested, a rotatable shaft mounted across the discharge end of said housing, means for continuously rotating said shaft, and a plurality of air deflectors mounted on said shaft in oblique relation therewith and in different phase relation to each other for continuously swerving the air blast as said air blast passes over said plurality of air deflectors to produce a wafting action of the limbs of said tree to be harvested.

5. A fruit harvesting machine comprising a wheel supported frame, a blower mounted on said frame for generating an air blast, a housing for conducting the air blast from said blower, a rotatable shaft mounted across the discharge end of said housing, a power drive for rotating said shaft, and a plurality of air deflectors secured to said shaft in oblique relation thereto, each deflector being positioned on said shaft in out of phase relation with others of said deflectors.

6. An agricultural machine comprising a relatively thin, vertically disposed housing having an elongate discharge opening in a generally vertical plane, a shaft journaled for rotation in said housing adjacent said opening, said shaft being disposed in a vertical position generally parallel to said opening, a plurality of deflector vanes secured to said shaft for rotation therewith, said vanes being disposed at an angle to the axis of rotation of said shaft whereby said vanes move with a wobble-plate action during rotation of said shaft, means for rotating said shaft, means for generating an air blast in said housing and directing it over said vanes and out said discharge opening.

7. An agricultural machine according to claim 6 wherein each of a plurality of said vanes is a frusto-conical member having its apex on the axis of rotation of said shaft.

8. An agricultural machine according to claim 6 wherein each of a plurality of said vanes is a dome-shaped member having its rounded surface facing upwardly.

9. An agricultural machine according to claim 6 wherein each of a plurality of said vanes is a circular plate having a first edge portion bent upwardly and a second diametrically opposite edge portion bent downwardly.

10. An agricultural machine according to claim 6 wherein each of a plurality of said vanes is a circular disc bent along a diameter to provide two semi-circular deflector portions disposed at an obtuse angle relative to each other.

11. An agricultural machine for harvesting tree-borne fruit comprising a relatively thin, vertically disposed housing having an elongate discharge opening, said opening being in a generally vertical plane and approximately as tall as a tree to be harvested, a shaft journaled for free rotation in said housing adjacent said opening, said shaft being disposed in a vertical position generally parallel to said opening, a plurality of deflector vanes secured to said shaft for rotation therewith, said vanes being disposed non-perpendicular to the axis of rotation of said shaft and in different phase relation whereby said vanes are rotated by the air blast and move with a wobble-plate action during rotation of said shaft, and means for generating an air blast in said housing and directing the air blast across said vanes and out of said discharge opening.

References Cited by the Examiner

UNITED STATES PATENTS

| 2,555,009 | 5/1951 | Romano | 98—40 |
| 2,632,375 | 3/1953 | Stair | 98—40 |
| 2,657,095 | 10/1953 | James | 239—222.11 |

LAURENCE V. EFNER, *Primary Examiner.*